United States Patent [19]

Nakamura et al.

[11] Patent Number: 4,880,050
[45] Date of Patent: Nov. 14, 1989

[54] THERMAL MANAGEMENT SYSTEM

[75] Inventors: Gary D. Nakamura, Seattle; Jerry D. Stephenson, Kent, both of Wash.

[73] Assignee: The Boeing Company, Seattle, Wash.

[21] Appl. No.: 208,440

[22] Filed: Jun. 20, 1988

[51] Int. Cl.$^4$ .................. F28D 15/02; B64G 1/50
[52] U.S. Cl. ................... 165/41; 165/104.14; 165/104.33; 244/163; 361/385
[58] Field of Search ............ 165/104.33, 104.14, 165/104.26, 41; 244/163; 361/385

[56] References Cited

U.S. PATENT DOCUMENTS

| | | | |
|---|---|---|---|
| 3,152,774 | 10/1964 | Wyatt | 244/163 |
| 3,548,930 | 12/1970 | Byrd | 244/163 |
| 3,749,156 | 7/1973 | Eby et al. | 165/104.26 |
| 4,162,701 | 7/1979 | Ollendorf | 165/32 |
| 4,420,035 | 12/1983 | Hewitt | 165/41 |
| 4,527,619 | 7/1985 | Cartier et al. | 244/163 |

*Primary Examiner*—Albert W. Davis, Jr.
*Attorney, Agent, or Firm*—Finnegan, Henderson, Farabow, Garrett & Dunner

[57] ABSTRACT

A thermal management system for a spacecraft includes a plurality of T-shaped pallets each having a radiator panel and mounting panel. The radiator panels are connected end to end to enclose an interior space including the mounting panels. The mounting panels have electronic equipment mounted thereon. L-shaped external heat pipes contact both the mounting panel and radiator panel of each pallet to provide heat transfer from the electronic equipment to the radiator panel when the radiator panel is facing away from the sun. In order to cool the electronic equipment mounted on a pallet facing the sun, a closed-loop heat pipe is disposed in the interior space and each pallet inclues L-shaped internal heat pipes contacting the closed-loop heat pipe and the mounting panel. Heat generated in the electronic equipment of the pallet facing the sun is transferred to the internal heat pipes via the mounting panel and then to the closed-loop heat pipe. The heat then is transferred to the radiator panels facing away from the sun via the closed-loop heat pipe, the internal heat pipes, the mounting panels, and the external heat pipes. In one embodiment, the mounting panels are comprised of a pair of spaced-apart mounting plates, and the legs of the external and internal L-shaped heat pipes contacting the mounting panel are disposed within this space separating the mounting plates.

8 Claims, 5 Drawing Sheets

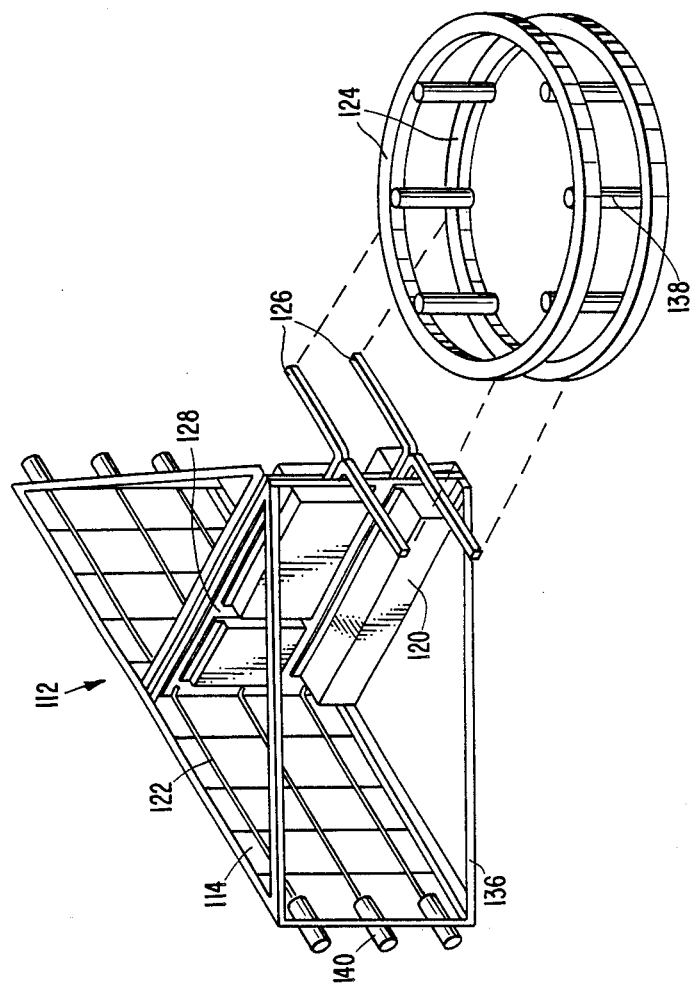

४,८८०,०५०

THERMAL MANAGEMENT SYSTEM

BACKGROUND OF THE INVENTION

1. Field of the Invention

This invention relates to a thermal management system. More particularly, the invention relates to a thermal management system for cooling electronic equipment on a space vehicle.

2. Description of the Related Art

Heat generated by electronic equipment on a space vehicle can damage critical components if not removed from the vehicle. Typically, radiators that face the cold sink of space are used to remove this heat. The heat generated by electronic equipment disposed on a common mounting plate is transferred to a radiator via heat pipes.

One proposal for the mounting of electronic equipment in a space vehicle is shown in FIG. 1, in which the spacecraft is designated generally by reference numeral 10. Spacecraft 10 is comprised of a plurality (eight in FIG. 1) of T-shaped pallets 12, each of which includes a radiator panel 14 and a mounting panel 16. The radiator panels 14 of pallets 12 are connected end to end to enclose an interior space 18 including mounting panels 16. Pieces of electronic equipment 20 are mounted on mounting panels 16, and heat generated by electronic equipment 20 is transferred to radiator panels 14 by L-shaped heat pipes 22.

The pattern of heat flow in the system of spacecraft 10 is depicted in FIG. 1 with reference to representative pallet 12a. Heat (arrows $Q_{in}$) generated in electronic equipment 20a is transferred to mounting plate 16a, which preferably is comprised of a material having high thermal conductivity. The heat then is conducted from mounting plate 16a by heat pipes 22a to radiator panel 14a. Arrows Qout represent heat transfer from radiator panel 14a to the cold sink of space.

Although the T-pallet construction shown in FIG. 1 provides an efficient arrangement for electronic equipment 20, cooling problems arise when radiator panel 14a, for example, faces the sun. In such an orientation, radiator panel 14a must be shut down to prevent absorption of solar energy into electronic equipment 20a mounted on mounting plate 16a. Typically, radiator panel 14a is shut down by expanding a control gas into the portion of heat pipes 20a mounted on radiator panel 14a. With the heat flow between radiator panel 14a and electronic equipment 20a shut down, however, there is no way for heat generated within electronic equipment 20a to be removed through radiator panel 14a.

One prior attempt at solving the problem of cooling electronic equipment in the portion of a spacecraft facing the sun incorporates steerable radiators. This approach minimizes the radiator's exposure to the sun by orienting the radiator away from the sun with rotating mounting arms. In this type of system, additional mechanical equipment, with its attendant cost and weight penalties, is required. In addition, surface area is wasted because the radiators are not mounted to the surface of the vehicle itself.

Another proposed solution to the solar exposure problem is thermal storage, in which a material having a low melting point is used to provide phase-change heat transfer to remove the heat generated by the electronic equipment mounted on the T-pallets facing the sun. The drawbacks to this proposal include difficulty in designing the phase-change material system with the vehicle's orbit and time of sun exposure, weight penalties associated with the thermal storage material, and the possibility of equipment contamination from the thermal storage material.

The present invention is intended to provide a thermal management system for cooling a spacecraft's electronic equipment arranged on interconnected T-pallets that provides for cooling electronic equipment on a T-pallet facing the sun without the drawbacks of steerable radiators or thermal storage systems using phase-change material.

Additional advantages of the present invention will be set forth in part in the description that follows and in part will be obvious from that description or can be learned by practice of the invention. The advantages of the invention can be realized and obtained by the apparatus particularly pointed out in the appended claims.

SUMMARY OF THE INVENTION

The present invention overcomes the problems of the prior art T-pallet thermal management systems by providing a heat-transfer path from the electronic equipment mounted on a sunfacing T-pallet to the radiator panels of the other T-pallets.

To overcome the problems of the prior art thermal management systems and in accordance with the purpose of the invention, as embodied and broadly described herein, the thermal management system of this invention for cooling electronic equipment on a space vehicle comprises a plurality of pallets each having a radiator panel and a mounting panel, with each of the radiator panels having an interior surface and an exterior surface and with each of the mounting panels having a first end and a second end. The first end of the mounting panel is connected to the interior surface of the radiator panel for each of the pallets, and the radiator panels of the pallets are connected end to end to enclose an interior space including the second ends of the mounting panels. The mounting panels have electronic equipment mounted thereon. The thermal management system also comprises cooling means for transferring heat from the mounting panel of one of the pallets to the radiator panel of another of the pallets.

Preferably, the cooling means includes a closed-loop heat pipe disposed on the interior space, at least one pair of external heat pipes contacting both the radiator panel and the mounting panel of each of the pallets, and at least one pair of L-shaped internal heat pipes contacting the closed-loop heat pipe and the mounting panel of each of the pallets. Each of the mounting panels preferably includes a pair of spaced-apart mounting plates with one leg of each of the internal heat pipes being disposed in the space between the mounting plates of the respective pallet.

The accompanying drawings, which are incorporated in and which constitute a part of this specification, illustrate at least one embodiment of the invention, and together with the description, explain the principles of the invention.

BRIEF DESCRIPTION OF THE DRAWINGS

FIG. 6 is an exploded partial perspective view of the second embodiment of the present invention.

DETAILED DESCRIPTION OF THE PREFERRED EMBODIMENTS

Reference now will be made in detail to the presently preferred embodiments of the invention, examples of which are illustrated in the accompanying drawings.

Figure 1:
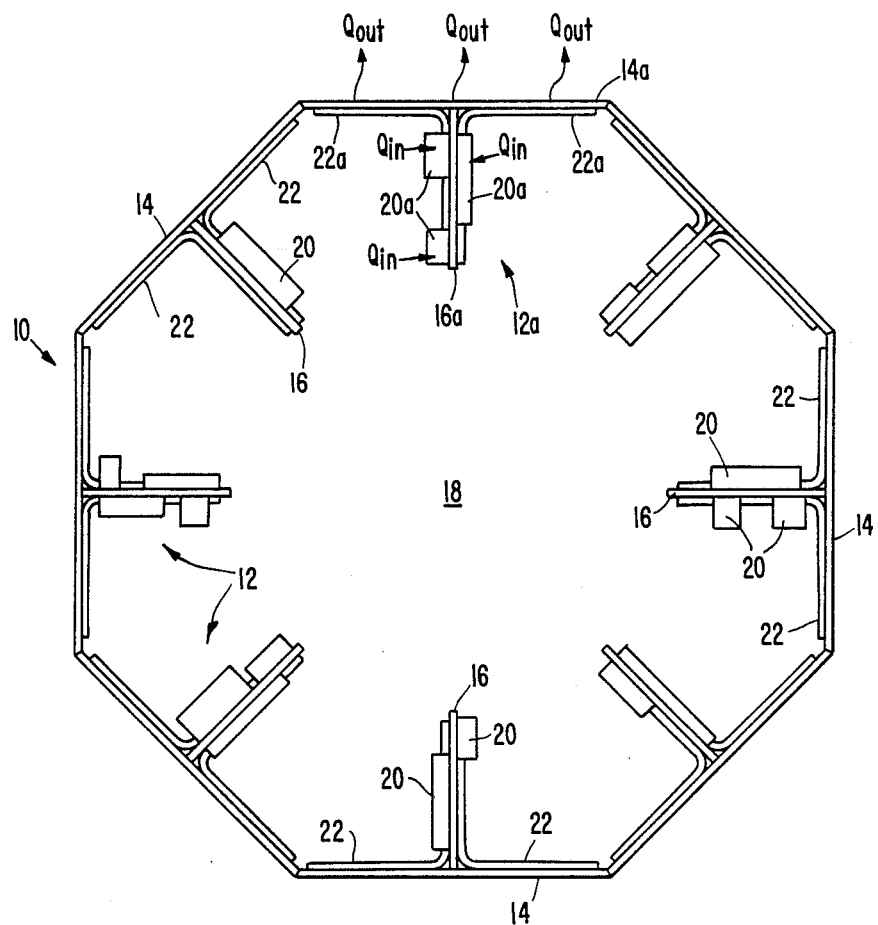
FIG. 1 is a schematic plan view of a space vehicle comprised of a plurality of interconnected T-shaped pallets having electrical equipment mounted thereon.
Figure 2:
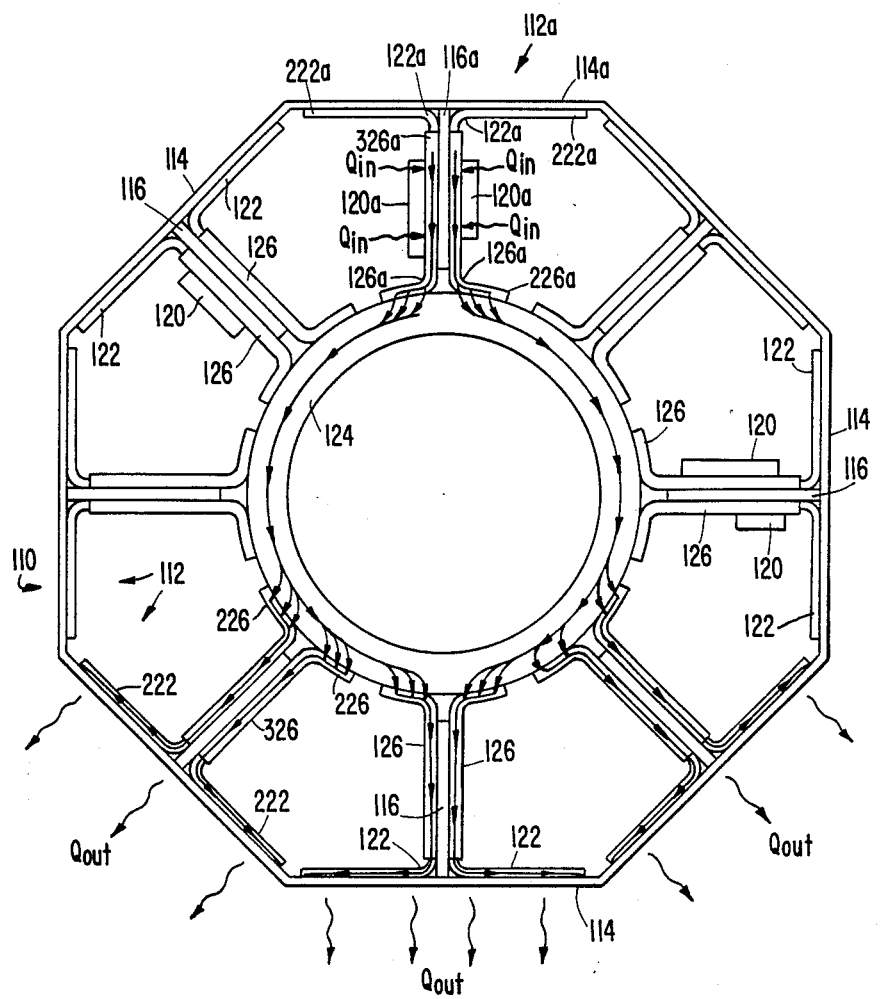
FIG. 2 is a schematic plan view of a space vehicle comprised of a plurality of interconnected T-shaped pallets having electronic equipment mounted thereon and including the thermal management system of the invention.
Figure 3:
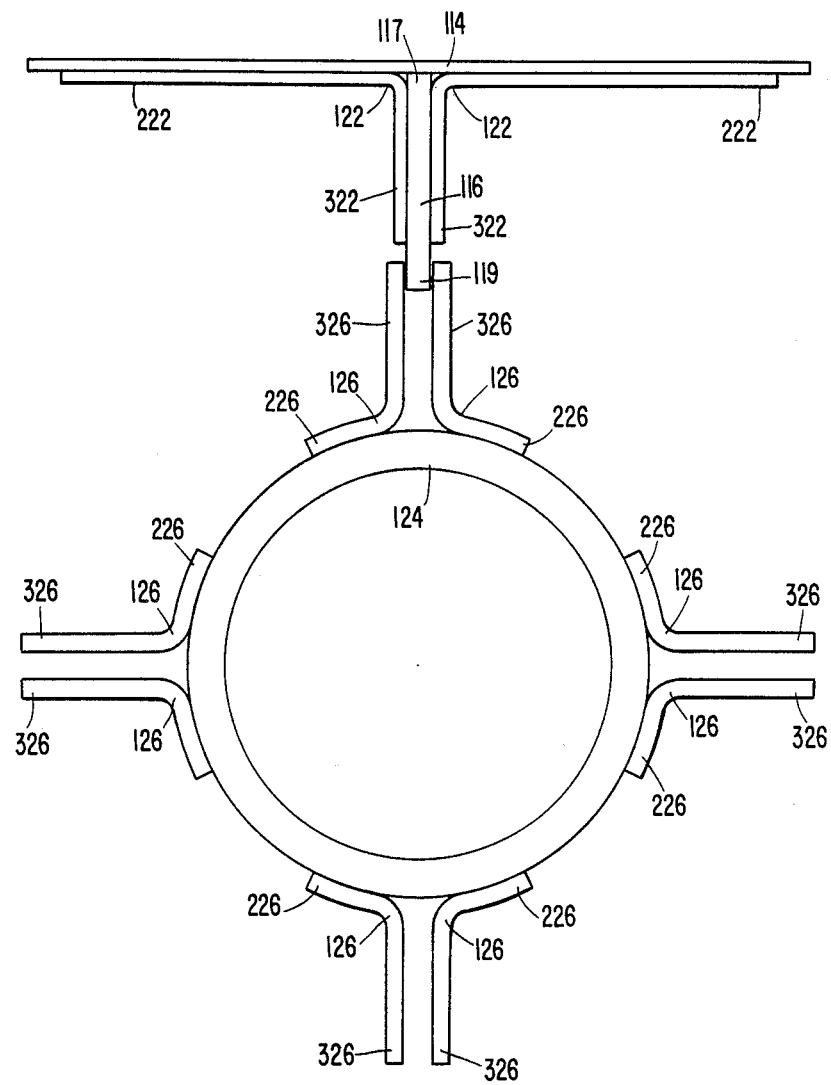
FIG. 3 is a partial plan view showing one embodiment of the thermal management system of the present invention, in which the internal and external heat pipes are mounted in the exterior of the mounting panel.

FIG. 2 is a schematic drawing of a space vehicle 110 incorporating the thermal management system of the present invention. As seen in FIG. 2, space vehicle 110 comprises eight interconnected T-shaped pallets 112, each having a radiator panel 114 and a mounting panel 116. With reference to FIG. 3, each mounting panel 116 has a first end 117 and a second end 119. For each pallet 112, first end 117 is connected to the interior surface of radiator panel 114. As seen in FIG. 2, radiator panels 114 are connected end to end to enclose an interior space including second ends 119 of mounting panels 116. One or more of mounting panels 116 has mounted thereon electronic equipment 120.

In accordance with the invention, the thermal management system for cooling the electronic equipment on space vehicle 110 includes cooling means for transferring heat from the mounting panel of one of the pallets to the radiator panel of another of the pallets. As embodied herein, the cooling means of the invention includes a closed-loop heat pipe 124 disposed in the interior space enclosed by radiator panels 114 and heat transfer means for transferring heat between closed-loop heat pipe 124 and each of radiator panels 114.

As embodied herein and shown in FIG. 2, the heat transfer means of the invention includes, for each pallet 112, a pair of external heat pipes 122 contacting both radiator panel 114 and mounting panel 116 and a pair of internal heat pipes 126 contacting closed-loop heat pipe 124 and mounting panel 116. Preferably, external heat pipes 122 and internal heat pipes 126 are L-shaped. As shown in FIG. 3, each external heat pipe 122 includes a first leg 222 contacting radiator panel 114 and a second leg 322 contacting mounting panel 116. Each internal heat pipe 126 includes a first leg 226 contacting closed-loop heat pipe 124 and a second leg 326 contacting mounting panel 116. Each of heat pipes 122, 124, and 126 contains a working fluid, such as Freon or ammonia, that absorbs heat by vaporization and rejects heat during condensation.

Operation of the thermal management system of this invention will be explained with reference to representative pallet 122a shown in FIG. 2. When radiator panel 114a of pallet 112a is directed away from the sun, heat generated by electronic equipment 120a is transferred to radiator panel 114a via mounting panel 116a and external heat pipes 122a. When radiator panel 114a faces the sun, however, radiator panel 114a is deactivated by expanding a control gas into first legs 222a of external heat pipes 122a and heat flows as shown by the arrows in FIG. 2.

Heat $Q_{in}$ generated in electronic equipment 120a is transferred by conduction to second legs 326a of internal heat pipes 126a via mounting panel 116a. The fluid in internal heat pipes 126a transfers heat from second legs 326a to first legs 226a. As first legs 226a are in contact with close-loop heat pipe 124, the heat is then transferred through the walls of internal heat pipes 26a and closed-loop heat pipe 124 to the fluid contained within closed-loop heat pipe 124. The fluid in closed-loop heat pipe 124 then transfers the heat to the fluid in first legs 226 of the internal heat pipes 126 diametrically opposed to sun-facing radiator panel 114a.

As further shown by the arrows in FIG. 2, the heat transferred to the fluid of the three lowermost pairs of internal heat pipes 126 is transferred to the corresponding external heat pipes 122 via mounting panels 116. With the first legs 222 of these lowermost external heat pipes 122 contacting their respective radiator panels 114, the heat (arrows $Q_{out}$) is dissipated into space on the cool side of space vehicle 110.

Each external heat pipe 122, internal heat pipe 126, and closed-loop heat pipe 124 is a discrete, closed-loop fluid system having an evaporator section at the high-temperature end and a condenser section at the low-temperature end. With reference to FIG. 2 in the situation where the sun is facing radiator panel 114a at the top of the drawing, the fluid within internal heat pipes 126a is vaporized in second leg 326a and condensed in first leg 226a, the fluid in closed-loop heat pipe 124 is vaporized in the top section and condensed in the lower section, and the fluid in the three lowermost internal heat pipes 126 is vaporized in first legs 226 and condensed in second legs 326, and the fluid in the three lowermost external heat pipes 122 is vaporized in second legs 322 and condensed in first legs 222.

As the orientation of space vehicle 110 changes with respect to the sun, the heat flow pattern automatically changes so that heat will flow from whichever panel faces the sun toward the panels on the diametrically opposite side by the inherent nature of the fluids to flow from high temperature sections to low temperature sections. This operation of the invention will tend to disperse heat load from the inactive pallet facing the sun to all other operable radiators at all orbital orientations. Lower, more stable component temperatures with lower fluctuation bands can be maintained, which will increase component life.

An additional advantage of this system is the ability to handle high localized heat loads in certain components. For example, if the heat generated in an electrical component on a particular pallet exceeds the heat dissipation capacity of that pallet, the additional heat load will naturally flow through internal heat pipes 126 to closed-loop heat pipe 124 to be dispersed among the other, less attached radiator panels. This also tends to minimize the temperature fluctuations experienced by the electrical equipment.

In the embodiment shown in FIG. 3, internal heat pipes 126 and external heat pipes 122 both contact mounting panels 116 on the exterior surfaces of mounting panel 116. An alternative embodiment is shown in FIGS. 4–6.

Figure 4:
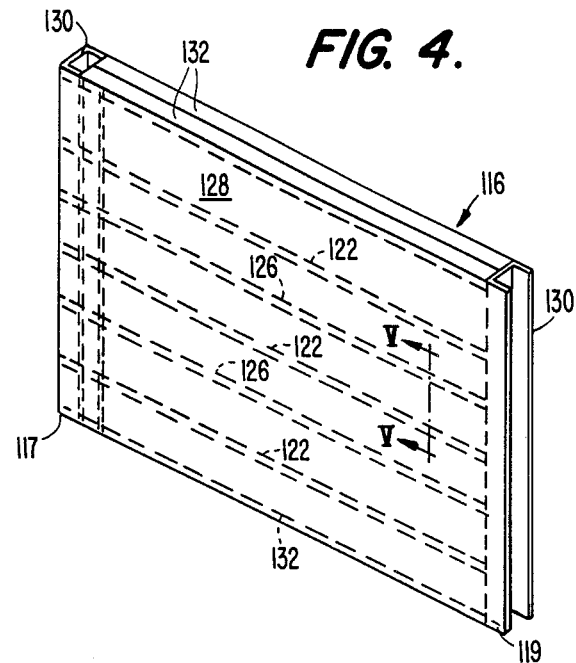
FIG. 4 is a perspective view of the mounting panel of a second embodiment of the present invention, in which the internal and external heat pipes are mounted in an interior space of the mounting panel.
Figure 5:
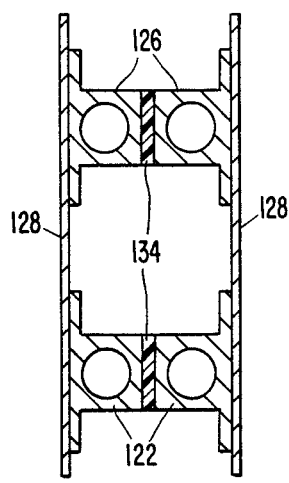
FIG. 5 is a cross sectional view of the mounting panel of FIG. 4 taken along lines V—V.

As shown in FIGS. 4 and 5, each mounting panel 116 of the second embodiment is comprised of a pair of spaced-apart mounting plates 128, preferably aluminum, which are connected together by a reinforcing member 130 at each of the first end 117 and the second end 119. In the second embodiment, mounting panel 116 further includes stiffeners 132 connecting reinforcing members 130 at the top and bottom edges of mounting panel 116.

As shown in the cross sectional view of mounting panel 116 depicted in FIG. 5, the second legs of internal heat pipes 126 and external heat pipes 122 are disposed in the space between mounting plates 128. Heat pipes 122, 126 preferably have flanged portions in contact with mounting plates 128 to facilitate heat exchange. Heat pipes 122, 126 can be attached to mounting plates 128 by bonding materials or mechanical fasteners. Preferably, the second legs of each pair of heat pipes 122, 126 are connected through a thermal gasket 134, which accomodates thermal expansion and contraction of the structure under temperature variation. The configuration of the second embodiment provides increased flexibility in a location of electronic equipment 120 onto mounting panel 116 by eliminating interference between electronic equipment 120 and heat pipes 122, 126.

In accordance with the invention and as shown in FIG. 6, the thermal management system of this invention preferably includes a plurality of closed-loop heat pipes 124 connected by connector heat pipes 138. FIG. 6 is an exploded view showing how a representative T-pallet 112 is connected to closed-loop heat pipes 124. The spacing between closed-loop heat pipes 124 should correspond with the spaces between the pairs of internal heat pipes 126 of pallet 112 so that they can be properly aligned. As shown in FIG. 6, each pallet 112 preferably includes stablizing members 136, which maintain the geometric configuration of pallet 112. Reference numerals 140 in FIG. 6 designates control gas reservoirs which release a gas into the first legs of external heat pipes 122 when the respective radiator panel 114 is facing the sun to deactivate that radiator panel.

It will be apparent to those skilled in the art that modifications and variations can be made in the apparatus of this invention without departing from the scope of the invention. For instance, although the closed-loop heat pipes have been described as circular, they also could be fabricated from a plurality of interconnected straight sections to form, for example, an octogon. The invention in its broader aspects is, therefore, not limited to the specific details and illustrated examples shown and described. Accordingly, it is intended that the present invention cover such modifications and variations provided that they fall within the scope of the appended claims and their equivalents.

What is claimed is:

1. A thermal management system for cooling electronic equipment on spacecraft, comprising:
   a plurality of pallets each having a radiator panel and a mounting panel, each of said radiator panels having an interior surface and an exterior surface, each of said mounting panels having a first end and a second end, said first end of said mounting panel being connected to said interior surface of said radiator panel for each of said pallets, said radiator panels of said pallets being connected end to end to enclose an interior space including said second ends of said mounting panels, said mounting panels having electronic equipment mounted thereon; and
   cooling means for transferring heat from said mounting panel of one of said pallets to said radiator panel of another of said pallets.

2. The system of claim 1, wherein said cooling means includes:
   a closed-loop heat pipe disposed in said interior space; and
   heat transfer means for transferring heat between said closed-loop heat pipe and each of said radiator panels.

3. The system of claim 2, wherein said heat transfer means includes:
   at least one external heat pipe contacting both said radiator panel and said mounting panel of each of said pallets; and
   at least one internal heat pipe contacting said closed-loop heat pipe and said mounting panel of each of said pallets.

4. The system of claim 3, wherein said internal heat pipes and said external heat pipes are substantially L-shaped.

5. The system of claim 2, wherein said closed-loop heat pipe is circular in shape.

6. A thermal management system for cooling electronic equipment on spacecraft, comprising:
   a plurality of pallets each having a radiator panel and a mounting panel, each of said radiator panels having an interior surface and an exterior surface, each of said mounting panels having a first end and a second end and including a pair of spaced apart mounting plates, said first end of said mounting panel being connected to said interior surface of said radiator panel for each of said pallets, said radiator panels of said pallets being connected end to end to enclose an interior space including said second ends of said mounting panels, said mounting panels having electronic equipment mounted thereon; and
   cooling means for transferring heat from said mounting panel of one of said pallets to said radiator panel of another of said pallets, said cooling means including a closed-loop heat pipe disposed in said interior space, at least one pair of external heat pipes contacting both said radiator panel and said mounting panel of each of said pallets, and at least one pair of internal heat pipes contacting said closed-loop heat pipe and said mounting panel of each of said pallets.

7. The system of claim 6, wherein:
   each of said internal heat pipes includes a first leg and a second leg and is substantially L-shaped;
   said first leg of each of said internal heat pipes is disposed in the space between said mounting plates of said respective pallet and fixed to one of said mounting plates; and
   said second leg of each of said internal heat pipes is fixed to said closed-loop heat pipe.

8. A thermal management system for cooling electronic equipment on spacecraft, comprising:
   a. a plurality of pallets each having a radiator panel and a mounting panel, each of said radiator panels having an interior surface and an exterior surface, each of said mounting panels having a first end and a second end, said first end of said mounting panel being connected to said interior surface of said radiator panel for each of said pallets, said radiator panels of said pallets being connected end to end to enclose an interior space including said second ends of said mounting panels, said mounting panels having electronic equipment mounted thereon; and
   b. cooling means for transferring heat from said mounting panel of one of said pallets to said radiator panel of another of said pallets, said cooling means including:

at least two closed-loop heat pipes disposed in said interior space, a plurality of connector heat pipes contacting and interconnecting said closed-loop heat pipes, at least one external heat pipe contacting both said radiator panel and said mounting panel of each of said pallets, and at least two pairs of internal heat pipes, each of said pairs of internal heat pipes contacting one of said closed-loop heat pipes and said mounting panel of each of said pallets.

* * * * *